United States Patent
Raynor et al.

(10) Patent No.: US 12,259,273 B2
(45) Date of Patent: Mar. 25, 2025

(54) LIGHT SENSOR

(71) Applicants: STMICROELECTRONICS (RESEARCH & DEVELOPMENT) LIMITED, Marlow (GB); STMicroelectronics (Grenoble 2) SAS, Grenoble (FR)

(72) Inventors: Jeffrey M. Raynor, Edinburgh (GB); Nicolas Moeneclaey, Vourey (FR)

(73) Assignees: STMICROELECTRONICS (RESEARCH & DEVELOPMENT) LIMITED, Marlow (GB); STMicroelectronics (Grenoble 2) SAS, Grenoble (FR)

( * ) Notice: Subject to any disclaimer, the term of this patent is extended or adjusted under 35 U.S.C. 154(b) by 384 days.

(21) Appl. No.: 17/660,321

(22) Filed: Apr. 22, 2022

(65) Prior Publication Data

US 2022/0341779 A1  Oct. 27, 2022

(30) Foreign Application Priority Data

Apr. 23, 2021 (EP) .................................. 21305534

(51) Int. Cl.
*G01J 1/44* (2006.01)
(52) U.S. Cl.
CPC ........... *G01J 1/44* (2013.01); *G01J 2001/446* (2013.01)
(58) Field of Classification Search
CPC ...... G01J 1/44; G01J 2001/446; H04N 25/77; H04N 25/772
See application file for complete search history.

(56) References Cited

U.S. PATENT DOCUMENTS

| | | |
|---|---|---|
| 6,998,659 B2 | 2/2006 | Raynor |
| 7,459,663 B2 | 12/2008 | Raynor |
| 8,885,152 B1 * | 11/2014 | Wright ..................... H04N 5/33 356/3.01 |
| 10,418,402 B2 | 9/2019 | Raynor |
| 10,922,590 B2 | 2/2021 | Raynor |
| 2007/0177043 A1 | 8/2007 | Kok |
| 2008/0258047 A1 | 10/2008 | Sakakibara et al. |
| 2009/0101798 A1 * | 4/2009 | Yadid-Pecht ........ H04N 25/531 250/214 A |
| 2017/0221947 A1 | 8/2017 | Shishido et al. |
| 2018/0262704 A1 * | 9/2018 | Xue ..................... H04N 25/778 |
| 2020/0366863 A1 * | 11/2020 | Etou ................. H01L 27/14643 |

FOREIGN PATENT DOCUMENTS

WO  2016191852 A1  12/2016

* cited by examiner

*Primary Examiner* — Georgia Y Epps
*Assistant Examiner* — Monica T Taba
(74) *Attorney, Agent, or Firm* — Slater Matsil, LLP

(57) ABSTRACT

The present disclosure relates to a sensor having pixels, each pixel having photodiodes having each a terminal coupled to a first node associated with the photodiode; and an amplifier having a first part and, for each photodiode, a second part associated with the photodiode. The first part includes an output of the amplifier and a first MOS transistor of a differential pair. Each second part includes a second MOS transistor of the differential pair having its gate coupled to the first node associated with the photodiode the second part is associated with; a first switch coupling a source of the second transistor to the first part of the amplifier; and a second switch coupling a drain of the second transistor to the first part of the amplifier.

20 Claims, 5 Drawing Sheets

LIGHT SENSOR

CROSS-REFERENCE TO RELATED APPLICATIONS

This application claims the priority to European Application No. 21305534.6, filed on Apr. 23, 2021, which application is hereby incorporated by reference herein in its entirety.

TECHNICAL FIELD

The present disclosure generally relates to electronic circuits, and, more particularly, to light sensors.

BACKGROUND

Known light sensors (e.g., ambient light sensors (ALS)) include multiple pixels arranged in a matrix of pixels with pixel rows and pixel columns.

Among these known light sensors, light sensors in which each pixel includes multiple photodiodes are known. In such light sensors, the readout circuit of each pixel is generally disposed at an end of a row or a column associated with the pixel. This results in long conductive wires for coupling the pixel to its readout circuit and, thus, in a routing capacitance on an input of the readout circuit. As the capacitance of the photodiodes of pixels tends to decrease, the impact of the routing capacitance during a readout phase of pixels becomes an issue.

This is, for example, the case when the photodiodes of pixels are of the island-type (i.e., when pixels include island photodiodes). Indeed, the intrinsic capacitance of an island photodiode is, for example, at least ten times lower than that of a conventional photodiode (e.g., a pinned photodiode). An island photodiode is, for example, described in U.S. Pat. No. 6,998,659 and U.S. patent application Ser. Nos. 10/418,402 and 10/922,590.

There is a need to overcome all or some of the drawbacks of known light sensors in, for example, known ambient light sensors.

SUMMARY

The embodiments of this disclosure address all or some drawbacks in known light sensors, for example, in known ambient light sensors.

An embodiment provides a light sensor having multiple pixels, each pixel including first photodiodes having each a terminal coupled to a first node of the pixel, the first node associated with the first photodiode; and a first amplifier having a first part common to all the first photodiodes and, for each first photodiode, a second part associated with the first photodiode, the first part of the first amplifier having an output of the first amplifier and a first MOS transistor of a differential pair of the first amplifier, each second part of the first amplifier having a second MOS transistor of the differential pair, the second transistor having a gate coupled to the first node associated with the first photodiode the second part is associated with; a first switch coupling a source of the second transistor to the first part of the first amplifier; and a second switch coupling a drain of the second transistor to the first part of the amplifier.

According to one embodiment, the first amplifier of each pixel further includes, for each first photodiode of the pixel a feedback loop having a first end connected to the first node associated with the first photodiode, the second part of the amplifier associated with the first photodiode having the feedback loop; and at least one third switch associated with the feedback look, the at least one third switch coupling a second end of the feedback loop to the output of the first amplifier.

According to one embodiment, the at least one third switch includes a first third switch included in the second part of the first amplifier associated with the first photodiode.

According to one embodiment, the at least one third switch includes a second third switch included in the first part and having a first conduction terminal connected to the output of the first amplifier, the first third switch of each second part of the first amplifier having a first conduction terminal connected to the second end of the feedback loop of the second part, and a second conduction terminal connected to a second conduction terminal of the second third switch.

According to one embodiment, in each of the pixels, the first part of the first amplifier includes an intermediate node of the differential pair, the intermediate node being coupled to a source of the first transistor; a first input of the first amplifier coupled to a gate of the first transistor; and a load stage of the differential pair coupled to a drain of the first transistor, the first switch of each second part being connected between the source of the second transistor of the second part and the intermediate node, and the second switch of each second part being connected between the load stage and the drain of the second transistor of the second part.

According to one embodiment, in each pixel, the first part of the first amplifier includes a fourth switch connected between the source of the first transistor and the intermediate node, and a fifth switch connected between the drain of the first transistor and the load stage, the fourth and fifth switches being preferably configured to be maintained closed.

According to one embodiment, each pixel further includes: second photodiodes having each a terminal coupled to a second node of the pixel, the second node being associated with the second photodiode; and a second amplifier having a first part common to all the second photodiodes and, for each second photodiode, a second part associated with the second photodiode, the first part of the second amplifier having an output of the second amplifier and a first MOS transistor of a differential pair of the second amplifier, and each second part of the second amplifier having: a second MOS transistor of the differential pair of the second amplifier, the second transistor having a gate coupled to the second node associated with the second photodiode the second part is associated with; a first switch coupling a source of the second transistor to the first part of the second amplifier; and a second switch coupling a drain of the second transistor to the first part of the second amplifier.

According to one embodiment, the second amplifier of each pixel further includes, for each second photodiode of the pixel a feedback loop having a first end connected to the second node associated with the second photodiode, the second part of the second amplifier associated with the second photodiode having the feedback loop; and at least one third switch associated with the feedback look, the at least one third switch coupling a second end of the feedback loop to the output of the second amplifier.

According to one embodiment, the at least one third switch includes a first third switch included in the second part of the second amplifier which is associated with the second photodiode.

According to one embodiment, the at least one third switch includes a second third switch included in the first part of the second amplifier and having a first conduction terminal connected to the output of the second amplifier, the first third switch of each second part of the second amplifier having a first conduction terminal connected to the second end of the feedback loop of the second part, and a second conduction terminal connected to a second conduction terminal of the second third switch.

According to one embodiment, in each pixel, the first part of the second amplifier includes an intermediate node of the differential pair of the first part, the intermediate node being coupled to a source of the first transistor of the first part; a first input of the second amplifier coupled to a gate of the first transistor of the first part; and a load stage of the differential pair of the first part, coupled to a drain of the first transistor of the first part, the first switch of each second part of the second amplifier being connected between the source of the second transistor of the second part and the intermediate node, the second switch of each second part of the second amplifier being connected between the drain of the second transistor of the second part and the load stage.

According to one embodiment, the first part of the second amplifier includes a fourth switch connected between the source of the first transistor and the intermediate node of the first part, and a fifth switch connected between the drain of the first transistor and the load stage of the first part, the fourth and fifth switches being preferably configured to be maintained closed.

According to one embodiment, in each pixel, each first photodiode belongs to only one group among several groups each having at least one of the first photodiodes, and each pixel includes a control circuit configured for: successively select each of the several groups; for each first photodiode of the selected group, close the first and second switches of the second part associated with the first photodiode, and close the at least one third switch associated with the feedback loop of the second part (AMP1-21, AMP1-22, AMP1-23, AMP1-24); and for each first photodiode of the non-selected group(s), open the first and second switches of the second part associated with the first photodiode, and open the at least one third switch associated with the feedback loop of the second part (AMP1-21, AMP1-22, AMP1-23, AMP1-24).

According to one embodiment, each feedback loop includes a capacitive element and a switch parallel-connected between the first and second ends of the feedback loop.

According to one embodiment, in each pixel, the second transistor of each second part is entirely disposed at less than 50 μm from the photodiode the second part is associated with.

Another embodiment provides a method implemented in the described light sensor, wherein reading at least one first photodiode of a pixel selected among the first photodiodes of pixel includes: for each selected first photodiode, closing the first and second switches of the second part of the first amplifier associated with the selected first photodiode to electrically couple the second part to the first part of the first amplifier; and for each non-selected first photodiode, opening the first and second switches of the second part of the first amplifier associated with the non-selected first photodiode to electrically disconnect the second part and the first part of the first amplifier.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
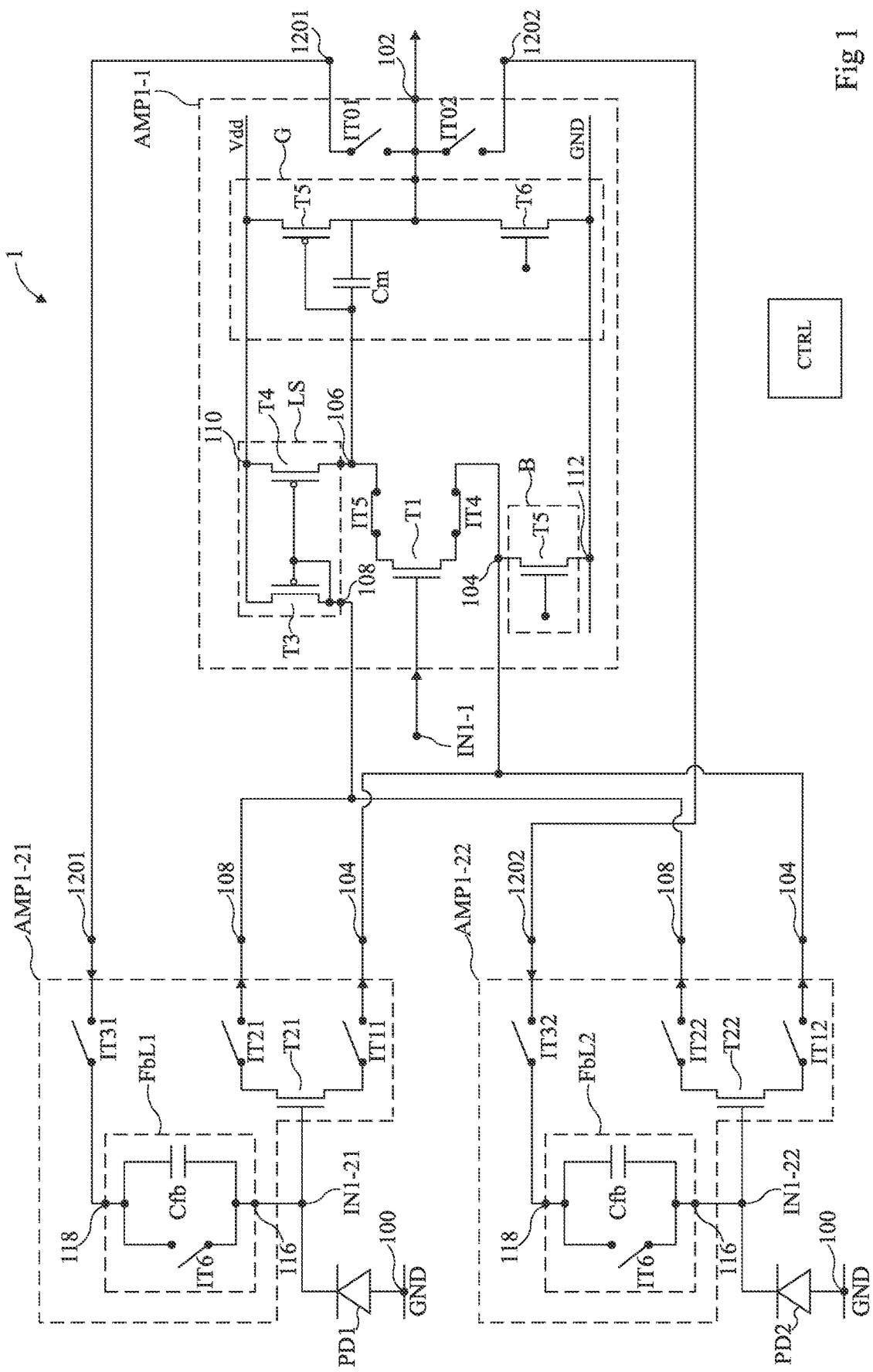
FIG. 1 is a diagram of an embodiment pixel of a light sensor.

Like features have been designated by like references in the various figures. In particular, the common structural or functional features among the various embodiments may have the same references and may dispose identical structural, dimensional, and material properties.

For the sake of clarity, only the operations and elements that are useful for an understanding of the embodiments described herein have been illustrated and described in detail. In particular, the usual electronic systems and applications which may include a light sensor have not been described, the described embodiments and variants being compatible with these usual systems and applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

In known light sensors having multiple pixels arranged in a matrix of pixel rows and pixel columns, in which each pixel includes multiple photodiodes, the readout circuit of each pixel usually includes amplifiers. This is, for example, the case of ambient light sensors where each pixel includes multiple color channels, each color channel having one or several photodiodes of the pixel. Preferably, the photodiodes of the different color channels are disposed relative to each other so that the different color channels have a common-centroid layout to reduce the sensor's spatial sensitivity. In each pixel, the photodiodes of the different color channels are disposed relative to each other such that the sensor is insensitive to the spatial distribution of light, the colors of light, or the orientation of the sensor (i.e., the angle of incident light).

Each amplifier of the readout circuit of the pixel has an input connected to a first electrode, or terminal, of one or several photodiodes of the pixel. Each amplifier includes an operational amplifier having one of its inverting input and non-inverting input connected to the first electrode of the one or several photodiodes. Each amplifier also includes a feedback loop connected between an output of the operational amplifier, that is, the output of the amplifier of the readout circuit, and the first electrode of the one or several photodiodes.

The operational amplifier includes a differential pair having a first transistor and a second transistor. The gate of the first transistor is a first input of the operational amplifier. The gate of the second transistor is a second input of the operational amplifier. The differential pair, along with a load stage of the differential pair and a bias circuit of the differential pair, form, for example, an input stage of the operational amplifier. The operational amplifier further includes a gain stage, which couples the differential pair to the output of the operational amplifier. The output of the operational amplifier is, for example, connected to an analog-to-digital converter (ADC).

To reduce the length of the conductive wire connecting the first electrode of a photodiode of a pixel to the input of an amplifier of the readout circuit of the pixel, that is, the length of the wire connecting the first electrode of this photodiode to the gate of a first one of the two transistors of the differential pair of the amplifier, the present disclosure proposes to split the differential pair, so that the first transistor is, for example, disposed close to the first electrode of the one or several photodiodes. In contrast, the second transistor of the differential pair may be disposed of far from the photodiodes.

The present disclosure proposes to split the amplifier into a first part having the second transistor of the differential pair and a second part having the first transistor of the differential pair. According to an embodiment, each first part of the amplifier further includes one amplifier's feedback loop. Further to the second transistor of the differential pair, the first part of the amplifier preferably includes the load stage of the differential pair, the bias circuit of the differential pair, and the gain stage of the amplifier.

The present disclosure proposes to provide one second part of the amplifier for each of multiple photodiodes of a pixel and selectively couples, for example, using switches or multiplexers, each second part to the same first part of the amplifier. By doing so, each second part may be disposed close to the photodiode the second part is associated with, for example, at less than 50 μm from the photodiode. As each second part of the amplifier includes one first transistor of the differential pair of the amplifier, the first transistor may be disposed close to the photodiode the second part is associated with, for example, at less than 50 μm from the photodiode. As a result, the routing capacitance between the photodiode and the corresponding first transistor of the differential pair is reduced.

FIG. 1 illustrates an example of an embodiment of a pixel 1 of a light sensor. Although not shown in FIG. 1, the sensor (e.g., an ambient light sensor) includes multiple pixels 1, preferably arranged in a matrix of pixel rows and columns.

Pixel 1 includes N photodiodes PDi (e.g., N island photodiodes PDi), N being an integer superior or equal to 2, and i being an integer having values in the range from 1 to N. In the embodiment of FIG. 1, N is equal to 2, and pixel 1 includes two photodiodes PD1 and PD2.

Each photodiode PDi of pixel 1 has an electrode, or terminal, coupled, preferably connected, to a node IN1-2i of pixel 1. In embodiments, the photodiode PDi has a terminal (e.g., cathode) coupled, preferably connected, to the node IN1-21 of pixel 1, the photodiode PD2, and having a terminal (e.g., cathode) coupled, preferably connected, to the node IN1-22 of pixel 1. Node IN1-i is to be associated with the photodiode PDi. In embodiments, the other terminal (e.g., anode) of each photodiode PDi is coupled, preferably connected, to a node 100 configured to receive a reference potential (e.g., ground potential GND).

Pixel 1 further includes an amplifier AMP1 not referenced in FIG. 1. The amplifier AMP1 is, for example, a capacitive transimpedance amplifier, CTIA. The amplifier AMP1 includes, or, more precisely, is made of, a first part AMP1-1, which is common to all the photodiodes PDi of pixel 1, and, for each photodiode PDi a second part AMP1-2i associated with the photodiode PDi. More precisely, in the example of FIG. 1, the amplifier AMP1 includes the second part AMP1-21 associated with the photodiode PD1, and the second part AMP1-22 associated with the photodiode PD2.

In embodiments, the amplifier AMP1 includes as much second part AMP1-2i as photodiodes PDi in pixel 1, but only one part AMP1-1. Thus, pixel 1 includes N second parts AMP1-2i.

The first part AMP1-1 of the amplifier AMP1 includes a metal-oxide-semiconductor, MOS, transistor T1. Transistor T1 is one of the two transistors of a differential pair of the amplifier AMP1.

The part AMP1-1 of amplifier AMP1 further includes an output 102 of the amplifier AMP1. In embodiments, although not shown on FIG. 1, the output 102 is coupled, for example, connected, to an input of an analog-to-digital converter, ADC. The amplifier AMP1 and the ADC are, for example, part of a readout circuit of pixel 1.

Preferably, all the second parts AMP1-2i of the amplifier are structurally identical to each other. However, a given component of one of these part AMP1-2i could have a value, for example, a capacitance value or a dimension value, for example, a channel length or width, different from that of the same component of another second part AMP1-2i of the amplifier AMP1.

In embodiments, each second part AMP1-2i of the amplifier AMP1 includes a MOS transistor T2i (T21, T22 in FIG. 1). Transistor T2i of each second part AMP1-2i of the amplifier AMP1 is the other one of the two transistors of the differential pair of the amplifier AMP1. Thus, transistors T1 and T2i are of the same type among the P-channel (PMOS) and N-channel (NMOS) types. In the example of FIG. 1, transistors T1 and T2i are NMOS transistors, although, in other examples not shown, transistors T1 and T2i are PMOS transistors.

In each part AMP1-2i of the amplifier AMP1, transistor T2i has its gate coupled, preferably connected, to the node IN1-2i associated with the photodiode PDi this second part is associated with.

Further, each second part AMP1-2i of the amplifier AMP1 includes a switch IT1i (IT11, IT12 in FIG. 1) and a switch IT2i (IT21, IT22 in FIG. 1). In each part AMP1-2i of the amplifier AMP1, switches IT1i and IT2i are configured so that transistor T2i of this part AMP1-2i forms, with the transistor T1, the differential pair of the amplifier AMP1 when switches IT1i and IT2i of this part AMP1-2i are closed, or, the in other words, in the on-state. When switches IT1i and IT2i of this part AMP1-2i are open (i.e., in the off-state), transistor T2i does not form, with transistor T1, the differential pair of the amplifier AMP1. In embodiments, each switch IT1i, IT2i is implemented with at least one MOS transistor, for example, using the Complementary Metal Oxide Semiconductor, CMOS, technology.

In each part AMP1-2i, the switch IT1i couples a source of the transistor T2i to the first part AMP1-1 of the amplifier AMP1. In embodiments, in each part AMP1-2i, the switch IT1i is configured to selectively couple the source of the transistor T2i to the first part AMP1-1 of the amplifier AMP1. Thus, in each part AMP1-2i, the switch IT1i is connected between the source of the transistor T2$i$ and part AMP1-1 of the amplifier AMP1. For example, in each part AMP1-2$i$ of the amplifier AMP1, a first conduction terminal of the switch IT1$i$ is coupled, preferably connected, to the part AMP1-1 of the amplifier AMP1, a second terminal of the switch IT1$i$ being coupled, preferably connected, to the source of transistor T2$i$.

In each part AMP1-2$i$, the switch IT2$i$ couples a drain of the transistor T2$i$ to the first part AMP1-1 of the amplifier AMP1. In embodiments, in each part AMP1-2$i$, the switch IT2$i$ is configured to selectively couple the drain of the transistor T2$i$ to the first part AMP1-1 of the amplifier AMP1. Thus, in each part AMP1-2$i$, the switch IT2$i$ is connected between the drain of the transistor T2$i$ and part AMP1-1 of the amplifier AMP1.

In embodiments, in each part AMP1-2$i$ of the amplifier AMP1, a first conduction terminal of the switch IT2$i$ is coupled, preferably connected, to the part AMP1-1 of the amplifier AMP1, a second terminal of the switch IT2$i$ being coupled, preferably connected, to the drain of transistor T2$i$.

More precisely, according to an embodiment, the first part AMP1-1 of the amplifier AMP1 includes an intermediate node 104 of the differential pair of the amplifier AMP1, and a load stage LS of the differential pair of the amplifier AMP1. A source of the transistor T1 is coupled to node 104. A gate of transistor T1 is coupled, preferably connected, to an input IN1-1 of the amplifier AMP1.

In embodiments, input, or node, IN1-1 is configured to receive the ground potential GND. A drain of the transistor T1 is coupled, preferably connected, to the load stage LS, for example, to a node 106 of the load stage LS. Thus, the switch IT1$i$ of each second part AMP1-2$i$ of the amplifier AMP1 is connected between the source of the corresponding transistor T2$i$ and the intermediate node 104, that is, the source of the transistor T1. Further, the switch IT2$i$ of each second part AMP1-2$i$ of the amplifier AMP1 is connected between the drain of the corresponding transistor T2$i$ and the load stage LS.

In embodiments, the switch IT2$i$ of each second part AMP1-2$i$ of the amplifier AMP1 is connected between the drain of the corresponding transistor T2$i$ and a node 108 of the load stage LS.

In embodiments, the load stage LS of the differential pair of the amplifier AMP1 is an active load stage LS. In this case, the load stage LS, for example, includes a current-mirror having one branch connected between node 106 and a node no configured to receive a first DC potential and one branch connected between nodes 108 and 110.

In embodiments, the load stage LS includes a MOS transistor T3 having a source connected to the node no and a drain connected to node 108 and a gate of transistor T3, the load stage LS further having a MOS transistor T4 having a source connected to the node 110, a drain connected to node 106, and a gate connected to the gate of transistor T3.

In the example of FIG. 1, where transistors T1 and T2$i$ are NMOS transistors, transistors T3 and T4 are, for example, PMOS transistors, and node no is configured to receive a supply potential Vdd.

In embodiments not shown, the load stage LS is different from the one described above as an example. The implementation of other examples of load stage LS is within the capabilities of those skilled in the art.

In embodiments, the intermediate node 104 of the differential pair of the amplifier AMP1 is coupled to a node 112 configured to receive a second DC potential, the difference between potential on node 110 and potential on node 112 corresponding to a supply voltage of the amplifier AMP1. In the example of FIG. 1, where transistors T1 and T2$i$ are NMOS transistors, node 112 is, for example, configured to receive the ground potential GND.

The intermediate node 104 of the differential pair is coupled to node 112 by a bias circuit B, configured to bias the differential pair. In the example of FIG. 1, the bias circuit B includes an NMOS transistor T5 having a source coupled, preferably connected, to node 112, a drain coupled, preferably connected, to node 104, and a gate configured to receive a control potential, although other examples of bias circuit implementations are within the capabilities of those skilled in the art.

According to an embodiment, and as illustrated in FIG. 1, the first part AMP1-1 of the amplifier AMP1 further includes a switch IT4 and a switch IT5. Switch IT4 is connected between the source of transistor T1 and node 104. Switch IT5 is connected between the drain of transistor T1 and node 106. Switches IT4 and IT5 are configured to be maintained closed (i.e., dummy switches). Thus, when the switches IT1$i$ and IT2$i$ of a part AMP1-2$i$ are closed, the influence of these switches on the differential pair is compensated by the influence of the dummy switches IT4 and IT5 on the differential pair.

In another embodiment not shown, the part AMP1-1 of amplifier AMP1 does not include the switches IT3 and IT4. In such an embodiment, the source of transistor T1 is preferably connected to node 104, the drain of transistor T1 is preferably connected to node 106.

As illustrated by FIG. 1, the amplifier AMP1, and, more precisely, the part AMP1-1 of the amplifier AMP1, includes a gain stage G, configured to couple the differential pair of the amplifier AMP1 to the output 102 of the amplifier AMP1. In the example where the load stage LS is an active load stage having a current-mirror, the gain stage G couples the node 106 to the output 102.

As an example, the gain stage G is of the Miller type. The gain stage includes a transistor T5 having a gate coupled, preferably connected, to node 106, a drain coupled, preferably connected, to output 102, and a source coupled, preferably connected, to node 110, and a Miller capacitor Cm being connected between the gate and the drain of the transistor T5. In this example, where the node no receives the potential Vdd, the transistor T5 is a PMOS transistor. The gain stage G further includes a transistor T6 having a gate configured to receive a control potential, a source coupled, preferably connected, to node 112, and a drain coupled, preferably connected, to output 102. In this example, where the node 112 receives the potential GND, the transistor T6 is an NMOS transistor.

It will be in the capabilities of those skilled in the art to replace the gain stage G described above as an example, with another gain stage G, for example, of the folded cascode type.

The differential pair T1, T2$i$, the load stage LS, the bias circuit B, and the load stage of the amplifier AMP1 are part of an operational amplifier of the amplifier AMP1.

According to an embodiment, further to one transistor T2$i$, each part AMP1-2$i$ of the amplifier AMP1 includes one feedback loop FbL$i$ of the amplifier AMP1 (FbL1, FbL2 in FIG. 1).

In each second part AMP1-2$i$ of the amplifier AMP1, the feedback loop FbL$i$ has one end 116 connected to the node IN1-2$i$ associated with the photodiode PD$i$ the second part AMP1-2$i$ is associated with. For example, the end 116 of the feedback loop FbL1 of part AMP1-21 is connected to node IN1-21, the end 116 of the feedback loop FbL2 of part AMP1-22 is connected to node IN1-22.

According to one embodiment, the amplifier AMP1 includes, for each feedback loop FbLi, a switch IT3$i$ (IT31, IT32 in FIG. 1) associated with the feedback loop FbLi. The switch IT3$i$ couples another end 118 of the feedback loop FbLi to the output 102 of the amplifier AMP1.

In embodiments, each feedback loop FbLi is associated with the switch IT3$i$, which is configured to selectively couple the end 118 of the feedback loop FbLi to the output 102 of the amplifier AMP1. Thus, for each feedback loop FbLi, the switch IT3$i$ associated with the feedback loop FbLi is connected between the end 118 of the feedback loop FbLi and the output 102 of the amplifier AMP1. For each feedback loop FbLi, the switch IT3$i$ is, for example, configured to be in the same state (closed or open) that the switches IT1$i$ and IT2$i$ of the second part AMP1-2$i$, which includes the feedback loop FbLi. As an example, each switch IT3$i$ is implemented with at least one MOS transistor, for example, using the CMOS technology.

According to one embodiment, as illustrated by FIG. 1, for each feedback loop FbLi, switch IT3$i$ belongs to the part AMP1-2$i$, which includes the feedback loop FbLi. For example, the part AMP1-21 includes the switch IT31 associated with the feedback loop FbL1, the part AMP1-22 has the switch IT32 associated with the feedback loop FbL2.

According to one embodiment, the amplifier AMP1 includes, for each feedback loop FbLi, and further to the switch IT3$i$ associated with the feedback loop FbLi, a switch IT0$i$ (IT01, IT02 in FIG. 1) associated with the feedback loop FbLi. For each feedback loop FbLi, as to the switch IT3$i$, the switch IT0$i$ couples the end 118 of the feedback loop FbLi to the output 102 of the amplifier AMP1. All the switches belong to the part AMP1-1 of the amplifier AMP1. Thus, for each feedback loop FbLi, the corresponding switches IT3$i$ and IT0$i$ are series-connected between the end 118 of the feedback loop FbLi and the output 102 of the amplifier AMP1. For each feedback loop FbLi, the switch IT0$i$ associated with the feedback loop FbLi is, for example, configured to be in the same state (closed or open) that the switches IT1$i$, IT2$i$ of the part AMP2-2$i$ having the feedback loop FbLi.

In embodiments, each switch IT0$i$ is implemented with at least one MOS transistor, for example, using the CMOS technology. An advantage of this embodiment where each feedback loop FbLi is two switches IT3$i$ and IT0$i$ is that, when both switches IT3$i$ and IT0$i$ associated with a given feedback loop FbLi are open, the capacitance of the conductive wire connecting the switch IT3$i$ with the switch IT0$i$ is disconnected from the amplifier AMP1.

In the example of FIG. 1, each switch IT3$i$ of part AMP1-2$i$ is connected between the end 118 of the feedback loop FbLi and a node 120$i$ (1201, 1202 in FIG. 1), the switch IT0$i$ being connected between the node 120$i$ and the output 102 of the amplifier AMP1.

In an embodiment, the switch IT31, respectively IT32, is connected between the end 118 of the feedback loop FbL1, respectively FbL2, and a node 1201, respectively 1202, the switch IT01, respectively IT02 being connected between node 1201, respectively 1202, and the output 102 of the amplifier AMP1.

Although not shown in FIG. 1, according to an alternative embodiment, each feedback loop FbLi is associated only with the switch IT3$i$ of the part AMP1-2$i$ the feedback loop FbLi is associated with. In embodiments, pixel 1 does not include the switches IT0$i$.

Although not shown in FIG. 1, according to a further alternative embodiment, each feedback loop FbLi is associated only with the switch IT0$i$ of the part AMP1-1 of the amplifier, the switch IT0$i$ being connected between the end 118 of the corresponding feedback loop FbLi and the output 102 of the amplifier AMP1. In embodiments, pixel 1 does not include the switches IT3$i$.

In embodiments, each feedback loop FbLi includes a switch IT6 and a capacitive element Cfb parallel-connected between the ends 116 and 118 of the feedback loop FbLi.

According to one embodiment, pixel 1 includes a control circuit CTRL configured to control the switches IT1$i$, IT2$i$, and IT3$i$ or IT0$i$, and, for example, to maintain the switch IT4 and IT5 closed. The circuit CTRL is, for example, further configured to control the switches IT6.

According to one embodiment, each photodiode PDi belongs to only one group of photodiodes PDi among multiple groups of at least one photodiode PDi. Preferably, each photodiode PDi of a given group is a photodiode of a corresponding given color channel of pixel 1. Thus, pixel 1 has multiple different color channels.

In embodiments, the photodiode(s) PDi of a color channel is configured to receive light having wavelengths in a range of wavelengths, and the photodiode(s) PDi of another color channel are configured to receive light having wavelengths in another range of wavelengths. The circuit CTRL is, for example, configured to successively select each group of photodiode(s) PDi, and, for each selected group, to close the switches IT1$i$ and IT2$i$ of the part AMP1-2$i$ associated with each photodiode PDi of the selected group, while opening the switches IT1$i$ and IT2$i$ of the other part(s) AMP1-2$i$, that is, the switches IT1$i$ and IT2$i$ of each part AMP1-2$i$ associated with a photodiode PDi of a non-selected group of photodiode(s) PDi.

In an embodiment, where N is equal to 2, photodiode PD1 belongs to a first color channel of pixel 1 and photodiode PD2 belongs to a second color channel of pixel 1.

In embodiments, the photodiode PD1 is configured to receive light having wavelengths in a first range of wavelengths, the photodiode PD2 is configured to receive light having wavelengths in a second range of wavelengths, the first and second ranges of wavelengths being different from each other. In this example, when the first color channel is selected, the circuit CTRL is configured to close switches IT11, IT21, IT31, and IT01, while opening switches IT12, IT22, IT32, and IT02, and, when the second color channel is selected, the circuit CTRL is configured to close switches IT12, IT22, IT32, and IT02, while opening switches IT11, IT21, IT31, and IT01.

An advantage of this embodiment is that the part AMP1-1 of the amplifier AMP1, and, preferably an analog-to-digital converter connected to the output 102 of the amplifier AMP1, are shared between the different color channels of pixel 1. This allows the increasing of the matching between the color channels to reduce the mismatch between the color channels.

According to another embodiment, all the photodiodes PDi belongs to the same color channel, pixel for example, having at least one other photodiode not shown on FIG. 1, which belongs to another color channel and is coupled to its own readout circuit. The circuit CTRL is, for example, configured to close all the switches IT1$i$, IT2$i$, IT3$i$, and IT0$i$ simultaneously.

A case where pixel 1, and, more precisely, its control circuit CTRL, is configured so that the switches IT1$i$, IT2$i$, IT3$i$, and IT0$i$ associated with M photodiodes PDi, M being an integer superior or equal to 2, are closed simultaneously, while the switches IT1$i$, IT2$i$, IT3$i$, and IT0$i$ associated with the other photodiodes PDi are open, is considered. Preferably, in such a case, the dimensions of the M transistors T2$i$ associated with the M photodiodes PDi are chosen so that the transistor equivalent to the parallel connection of these M transistors T2$i$ has the same dimensions as those of transistor T1.

Figure 2:
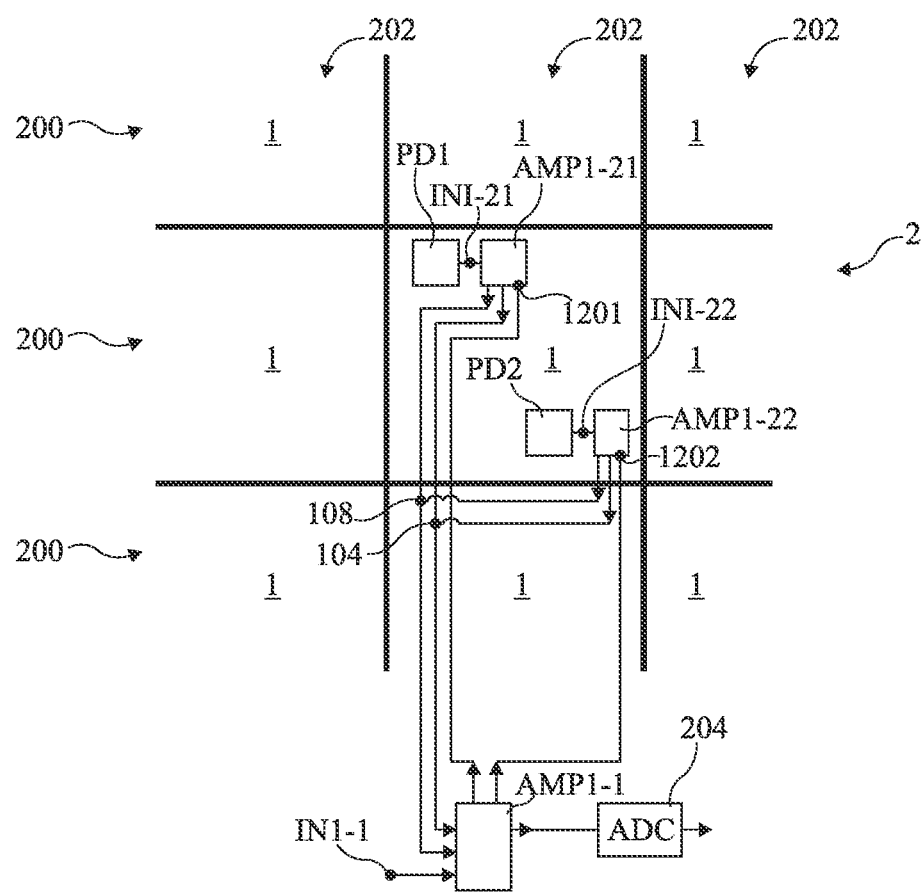
FIG. 2 is a schematic and diagram of an embodiment light sensor.

FIG. 2 illustrates, in a very schematic manner, and under the form of blocks, an embodiment of a light sensor 2 having pixel 1 of FIG. 1. For example, sensor 2, for example, an ambient light sensor, includes a matrix of pixels 1 arranged in rows 200 and columns 202, only three rows 200 and three columns 202 being represented, partially, on FIG. 1, and only one complete pixel 1 being represented on FIG. 1.

As shown only for pixel 1 in the middle of FIG. 2, each second part AMP1-21, AMP1-22 of the amplifier AMP1 (not referenced in FIG. 2) is disposed close to the photodiode PD1, PD2 the second part is associated with. Further, the first part AMP1-1 of the amplifier AMP1 is disposed far from the photodiodes PD1 and PD2 of pixel 1, for example, on the bottom of the column 202 having the pixel.

According to an embodiment, each part AMP1-2$i$ is disposed, preferably entirely disposed, close to the photodiode PDi this part AMP1-2$i$ is associated with, for example, at less than 50 µm of the photodiode PDi this part AMP1-2$i$ is associated with.

According to an embodiment, each part transistor T2$i$ is disposed close, preferably at less than 50 µm, to the photodiode PDi which is coupled, preferably connected, to the transistor T2$i$.

In an embodiment, the output 102 of the amplifier AMP1 is coupled, for example, connected, to an input of analog-to-digital converter 204.

Figure 3:
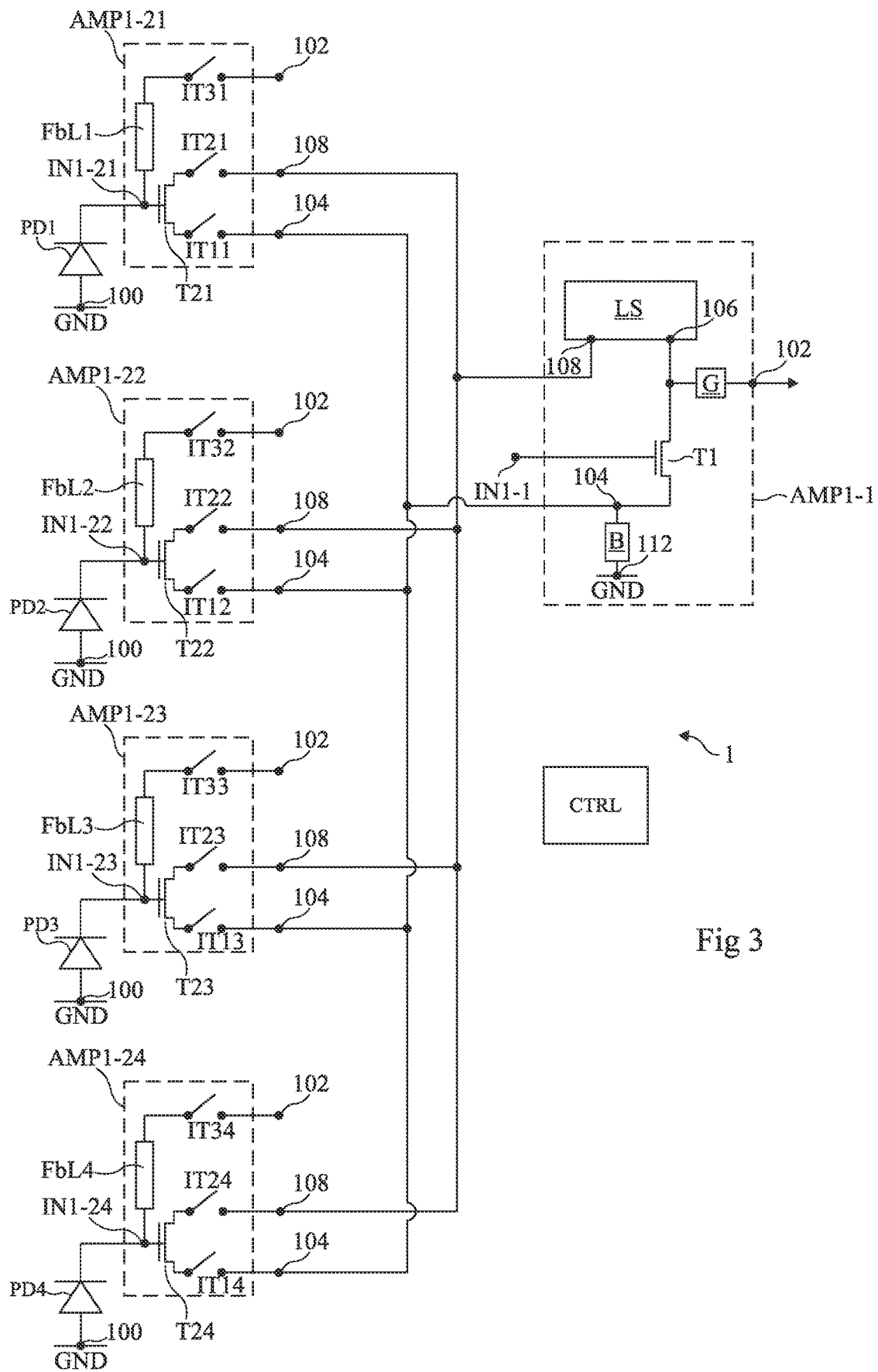
FIG. 3 is a diagram of an embodiment pixel.

FIG. 3 illustrates another example of pixel 1. In the example of the embodiment of FIG. 3, N is equal to 4. Thus, compared with pixel 1 of FIG. 1, the pixel of FIG. 3 further includes a node IN1-23 and a node IN1-24, a photodiode PD3 and a photodiode PD4, the first electrode, in this example the cathode, of the photodiode PD3, respectively PD4, being coupled, preferably connected, to node IN1-23, respectively IN1-24, a second part AMP1-23 of the amplifier AMP1, the second part AMP1-23 being associated with the photodiode PD3 and having a transistor T23, a feedback loop FbL3 and switches IT13, IT23, and IT33, a second part AMP1-24 of the amplifier AMP1, the second part AMP1-24 being associated with the photodiode PD4 and having a transistor T24, a feedback loop FbL4 and switches IT14, IT24, and IT34.

Further, in the example of FIG. 3, pixel 1 does not include the switches IT0$i$, and nodes 120$i$ are merged with the output 102 of the amplifier AMP1 (not referenced on FIG. 3). However, it will be in the capabilities of those skilled in the art to adapt pixel 1 of FIG. 3 to the case where pixel 1 further includes the switches IT0$i$, or to the case where pixel 1 of FIG. 3 does not include the switches IT3$i$ but includes the switches IT0$i$.

Further, in the example of FIG. 3, the part AMP1-1 does not include the switches IT4 and IT5, although it will be in the capabilities of those skilled in the art to add these switches, based on the functional and structural description of pixel 1 made in relation with FIG. 1.

Further, to not surcharge FIG. 3, the feedback loops FbLi, the load stage LS, the bias circuit B, and the gain stage G are represented under the form of blocks.

In a first example, each photodiode PDi belongs to a different color channel of pixel 1. Thus, pixel 1 includes four different color channels.

In a second example, pixel 1 includes two different color channels, each having two photodiodes PDi. For example, a first color channel includes photodiodes PD1 and PD2, and a second color channel includes photodiodes PD3 and PD4.

In a third example, pixel 1 includes a first color channel having only one photodiode PDi, for example, the photodiode PD1, and second color channel having the other photodiodes PDi, for example, the photodiodes PD2, PD3, and PD4.

In a fourth example, pixel 1 includes a first color channel having one photodiode PDi, for example, the photodiode PD1, a second color channel having one photodiode PDi, for example, the photodiode PD2, and a third color channel having the other photodiodes PDi, for example, the photodiodes PD3 and PD4.

In a fifth example, pixel 1 includes four color channel having each one of the photodiodes PDi.

Other examples of repartition of the photodiodes PDi in at least two groups, or color channels, are in the capabilities of those skilled in the art.

As in FIG. 1, an advantage of pixel 1 of FIG. 2 is that part AMP1-1 of the amplifier AMP1 is shared by all the photodiodes PDi of pixel 1, and that each part AMP1-2$i$, or, at least each transistor T2$i$, may be disposed close to the associated photodiode PDi, whereas the part AMP1-1 may be disposed far from the photodiodes PDi.

Figure 4:
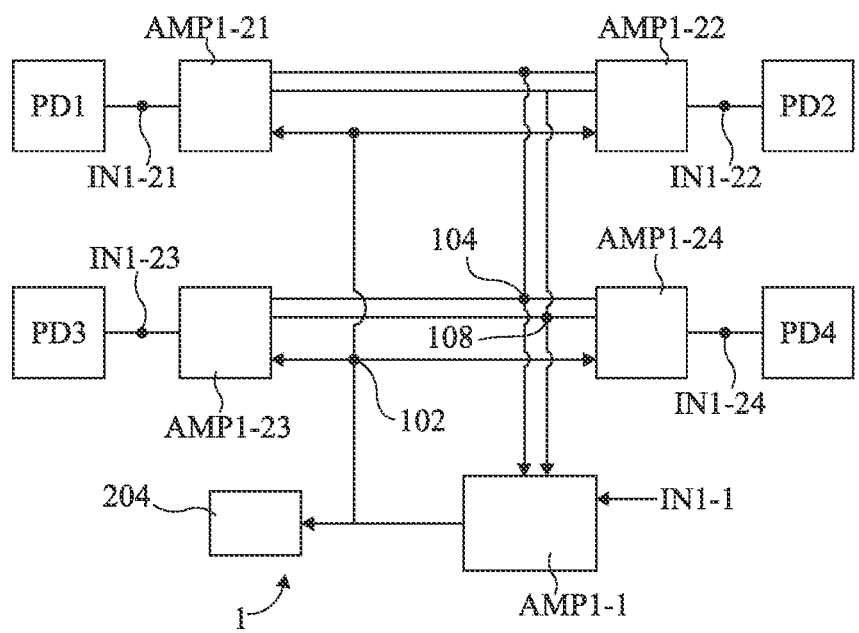
FIG. 4 is a schematic and diagram of an embodiment light sensor.

FIG. 4 illustrates, in a very schematic manner, and under the form of blocks, an embodiment of a light sensor 4 having pixel 1 of FIG. 3.

In an embodiment, the sensor 4, for example, an ambient light sensor, includes a matrix of pixels 1 arranged in rows and columns, although only one pixel 1 is represented in FIG. 4.

As shown in FIG. 4, each second part AMP1-2$i$ of the amplifier AMP1 (not referenced in FIG. 4) is disposed close to the photodiode PDi the second part AMP1-2$i$ is associated with. Further, the first part AMP1-1 of the amplifier AMP1 may be disposed far from the photodiodes PDi of pixel 1, for example, on the bottom of a column having pixel 1.

According to an embodiment, each part AMP1-2$i$ is disposed, preferably entirely disposed, close to the photodiode PDi this part AMP1-2$i$ is associated with, for example, at less than 50 µm of the photodiode PDi this part AMP1-2$i$ is associated with.

According to an embodiment, each transistor T2$i$ (FIG. 3) is disposed close, preferably at less than 50 µm, to the photodiode PDi which is coupled, preferably connected, to the transistor T2$i$.

As an example, the output 102 of the amplifier AMP1 is coupled, for example, connected, to an input of analog-to-digital converter 204.

In the embodiments and variants described above, it will be in the capabilities of those skilled in the art to change the value of N, such that pixel 1 includes only one color channel with all the N photodiodes PDi, or at least two different color channels, each color channel having one or multiple photodiodes PDi and a number of photodiodes PDi equal or different to the number of photodiodes PDi of another color channel.

It will be in the capabilities of those skilled in the art to arrange the photodiodes PDi of the different color channels of pixel 1 such that pixel 1 has a common-centroid layout.

Figure 5:
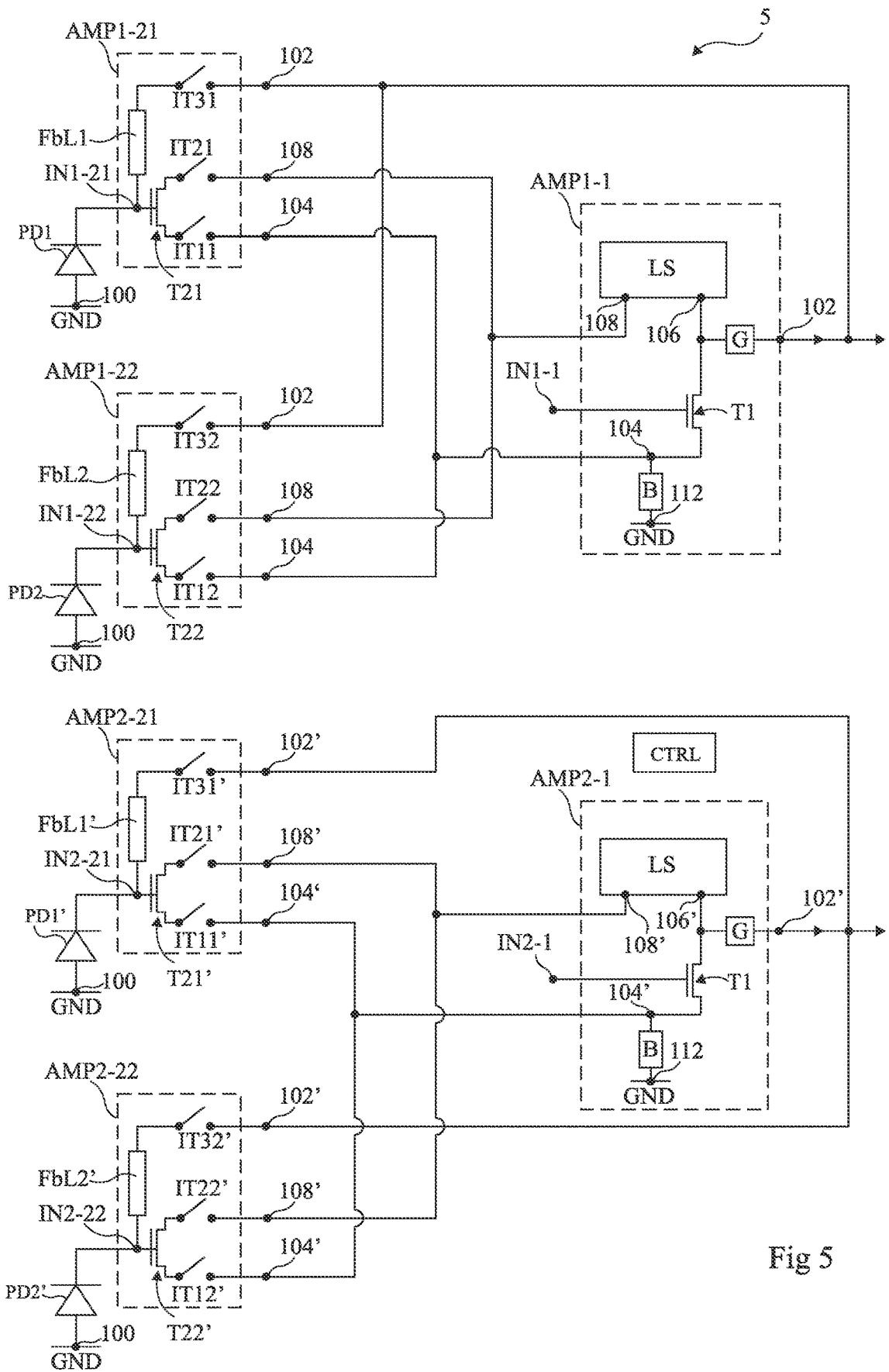
FIG. 5 is a diagram of an embodiment pixel.

FIG. 5 illustrates a further embodiment of a pixel 5 of a light sensor. Although not shown in FIG. 5, the sensor, for example, an ambient light sensor, includes multiple pixels 5, preferably arranged in a matrix of pixel rows and pixel columns.

Pixel 5 includes many elements in common with pixel 1 described in relation with FIGS. 1 to 4, and only the differences between pixel 5 and pixel 1 will be emphasized here. In particular, pixel 5 includes, as pixel 1, N photodiodes PDi, the amplifier AMP1 (not referenced in FIG. 5), and, thus, the part AMP1-1 of the amplifier AMP1, N nodes IN1-2*i* being each associated with a corresponding photodiode PDi, N parts AMP1-2*i* of the amplifier AMP1 being each associated with the corresponding photodiode PDi, and, preferably, the control circuit CTRL.

In the example of FIG. 5, N is equal to 2, although it will be in the capabilities of those skilled in the art to increase the value of N. Thus, pixel 5 includes the photodiodes PD1 and PD2, the nodes IN1-21 and IN1-22, and the parts AMP1-21 and AMP1-22.

Further, in the example of FIG. 5, the part AMP1-1 of the amplifier AMP1 does not include the switches IT0*i*, and nodes 120*i* are merged with the output 102 of the amplifier AMP1. However, it will be in the capabilities of those skilled in the art to adapt pixel 5 to the case where the part AMP1-1 includes the switches IT0*i*, or to the case where the parts AMP1-2*i* do not include the switches IT3*i* but the part AMP1-1 includes the switches IT0*i*.

Further, in the example of FIG. 5, the part AMP1-1 does not include the switches IT4 and IT5, although it will be the capabilities of those skilled in the art to add these switches, based on the functional and structural description of pixel 1 made above.

Further, to not surcharge FIG. 5, the feedback loops FbLi (FbL1, FbL2), the load stage LS, the bias circuit B, and the gain stage G of the amplifier AMP1 are represented under the form of blocks.

Further to the photodiodes PDi, pixel 5 includes K photodiodes PDj', K being an integer superior or equal to 2, and j being an integer having values in the range from 1 to K. Preferably, the photodiodes PDj' are island photodiodes.

In the example of the embodiment of FIG. 5, K is equal to 2 and pixel 5 includes two photodiodes PD1' and PD2'.

Each photodiode PDj' of pixel 5 has an electrode, or terminal, coupled, preferably connected, to a node IN2-2*j* of pixel 5.

In embodiments, the photodiode PD1' has a terminal, for example, its cathode, coupled, preferably connected, to the node IN2-21, the photodiode PD2' having a terminal, for example, its cathode, coupled, preferably connected, to the node IN2-22. Node IN2-2*j* is to be associated with the photodiode PDj'.

In embodiments, the other terminal, for example, the anode, of each photodiode PDj' is coupled, preferably connected, to the node 100.

In embodiments, pixel 5 further includes an amplifier AMP2 (not referenced in FIG. 5). The amplifier AMP2 is, for example, a capacitive transimpedance amplifier, CTIA. The amplifier AMP2 includes, or, more precisely, is made of, a first part AMP2-1, which is common to all the photodiodes PDj', and, for each photodiode PDj', a second part AMP2-2*j* associated with the photodiode PDj'. Thus, pixel 5 includes K second parts AMP2-2*j*. More precisely, in the example of FIG. 5, the amplifier AMP2 includes the second part AMP2-21 associated with the photodiode PD1', and the second part AMP2-22 associated with the photodiode PD2'.

The first part AMP2-1 of the amplifier AMP2 is similar or identical to the first part AMP1-1 of the amplifier AMP1. However, nodes 102, 104, 106 and 108 of the part AMP1-1 correspond to respective nodes 102', 104', 106' and 108' in part AMP2-1. Thus, part AMP2-1 of the amplifier AMP2 includes the nodes 102', 104', 106' and 108', a transistor T1, a load stage LS, a gain stage G, and a bias circuit B, the interconnections of these elements the ones with the others being the same as those described in relation with FIGS. 1 to 4 for the respective elements 102, 104, 106, 106, T1, LS, G and B of the part AMP1-1 of amplifier AMP1.

Transistor T1 of part AMP2-1 is one of the two transistors of a differential pair of the amplifier AMP2.

Transistor T1 has a gate coupled, preferably connected, to an input IN2-1 of the amplifier AMP2. The input IN2-1 is, for example, configured to receive the ground potential GND.

In embodiments, although not shown in FIG. 5, the output 102 is coupled, for example, connected, to an input of a first analog-to-digital converter, the output 102' is coupled, for example, connected, to an input of a second analog-to-digital converter. The amplifier AMP1 and the first converter are, for example, part of a readout circuit of the photodiodes PDi of pixel 5, the amplifier AMP2 and the second converter being, for example, part of a readout circuit of the photodiodes PDj' of pixel 5.

Preferably, all the second pails AMP2-2*j* of the amplifier are structurally identical to each other, although a given component of one these part AMP2-2*j* could have a value, for example, a capacitance value, or a dimension, for example, a channel length or width, different from those of the same component of another second part AMP2-2*j*.

Each second part AMP2-2*j* of the amplifier AMP2 includes a MOS transistor T2*j*' (T21', T22' in FIG. 5). Transistor T2*j*' of each second part AMP2-2*j* is the other one of the two transistors of the differential pair of the amplifier AMP2. Thus, transistors T1 and T2*j*' are the same type among the P-channel and N-channel types. In the example of FIG. 5, transistor T1 is an NMOS transistor, although, in other examples not shown, transistor T1 is a PMOS transistor.

In each part AMP2-2*j* of the amplifier AMP2, transistor T2*j*' has its gate coupled, preferably connected, to the node IN2-2*j* associated with the photodiode PDj'.

Further, each second part AMP2-2*j* of the amplifier AMP2 includes a switch IT1*j*' (IT', IT12' in FIG. 5) and a switch IT2*j*' (IT21', IT22' in FIG. 5). In each part AMP2-2*j* of the amplifier AMP2, switches IT1*j*' and IT2*j*' are configured so that transistor T2*j*' forms, with the transistor T1 of part AMP2-1, the differential pair of the amplifier AMP2 when switches IT1*j*' and IT2*j*' are closed. Each switch IT1*j*', IT2*j*' is, for example, implemented with at least one MOS transistor, for example, using the CMOS technology.

In each part AMP2-2*j*, the switch IT1*j*' couples a source of the transistor T2*j*' to the first part AMP2-1 of the amplifier AMP2, similarly to the switch IT1*i* which couples the source of transistor T2*i* to the part AMP1-1 of amplifier AMP1. Thus, in each part AMP2-2*i*, the switch IT1*j*' is connected between the source of the transistor T2*j*' and the part AMP2-1 of the amplifier AMP2.

In embodiments, in each part AMP2-2*j* of the amplifier AMP2, a first conduction terminal of the switch IT1*j*' is coupled, preferably connected, to the part AMP2-1 of the amplifier AMP2, a second terminal of the switch IT1*j*' is coupled, preferably connected, to the source of transistor T2*j*'.

In each part AMP2-2*j*, the switch IT2*j*' couples a drain of the transistor T2*j*' to the first part AMP2-1 of the amplifier AMP2, similarly to the switch IT2*i* couples the drain of the transistor T2*i* to the first part AMP1-1 of the amplifier AMP1. Thus, in each part AMP2-2*j*, the switch IT2*j*' is connected between the drain of the transistor T2*j*' and the part AMP2-1.

In embodiments, in each part AMP2-2*j* of the amplifier AMP2, a first conduction terminal of the switch IT2*j*' is coupled, preferably connected, to the part AMP2-1 of the amplifier AMP2, a second terminal of the switch IT2j' is coupled, preferably connected, to the drain of transistor T2j'.

More precisely, according to an embodiment, the switch IT1j' of each second part AMP2-2j of the amplifier AMP2 is connected between the source of the corresponding transistor T2j' and the intermediate node 104' of part AMP2-1 of amplifier AMP2, that is, the source of the transistor T1 of the amplifier AMP2, and the switch IT2j' of each second part AMP2-2j of the amplifier AMP2 is connected between the drain of the corresponding transistor T2j' and the node 108' of the amplifier AMP2.

In the embodiment of FIG. 5, the source of transistor T1 of the amplifier AMP2 is connected to node 104', the drain of transistor T1 of the amplifier AMP2 is connected to node 106'.

However, in another embodiment not shown, similarly to the embodiment where part AMP1-1 of amplifier AMP1 includes switches IT4 and IT5, part AMP2-1 of amplifier AMP2 includes a switch connected between the source of transistor T1 of part AMP2-1 and node 104', and a switch connected between the drain of transistor T1 of part AMP2-1 and the node 106'. These two switches are configured to be maintained closed (i.e., dummy switches).

The load stage LS of amplifier AMP2, the bias circuit B of amplifier AMP2, the load stage LS of amplifier AMP2, and the differential pair of amplifier AMP2 are part of an operational amplifier of the amplifier AMP2.

According to an embodiment, each part AMP2-2j includes one feedback loop FbLj' (FbL1', FbL2' in FIG. 5) of the amplifier AMP2. Although not shown, preferably, each feedback loop FbLj' is structurally identical to the feedback loops FbLi. Further, each feedback loop FbLj' has one end 116 connected to the corresponding node IN2-2j', in a similar fashion that each feedback loop FbLi has one end 116 connected to the corresponding node IN1-2i.

According to one embodiment, the amplifier AMP2 includes, for each feedback loop FbLj', a switch IT3j' (IT31', IT32' in FIG. 2) associated with the feedback loop FbLj'. The switch IT3j' couples another end 118 of the feedback loop FbLj' to the output 102' of the amplifier AMP2, in a similar fashion, that, for each feedback loop FbLi, the switch IT3i couples the end 118 of the feedback loop FbLi to the output 102 of the amplifier AMP1.

In embodiments, each feedback loop FbLj' is associated with a corresponding switch IT3j'. The switch IT3j' associated with each feedback loop FbLj' is, for example, configured to be in the same state (closed or open) that the switches IT1j' and IT2j' of the second part AMP2-2j having the feedback loop FbLj'.

In embodiments, each switch IT3j' is implemented with at least one MOS transistor, for example, using the CMOS technology. Each part AMP2-2j' includes a corresponding switch IT3j'.

According to one embodiment not shown, the amplifier AMP2 includes, for each feedback loop FbLj', and further to the switch IT3j', a supplementary switch associated with the feedback loop FbLj' and belonging to part AMP2-1 of the amplifier AMP2. For each feedback loop FbLj', this supplementary switch couples the end 118 of the feedback loop FbLj' to the output 102' of amplifier AMP2, in a similar fashion that, for each feedback loop FbLi, the switch IT0i couples the end 118 of the feedback loop FbLi to the output 102 of the amplifier AMP1.

According to one embodiment, for each feedback loop FbLj', the supplementary switch is series-connected with the switch IT3j', between the end 118 of the feedback loop FbLj' and the output 102' of the amplifier AMP2. For each feedback loop FbLj', the supplementary switch is, for example, configured to be in the same state (closed or open) that the switches IT3j'.

In embodiments, each supplementary switch is implemented with at least one MOS transistor, for example, using the CMOS technology. According to an alternative embodiment, pixel 5 does not include the switches IT3j'.

According to one embodiment, the control circuit CTRL is further configured to control the switches IT1j', IT2j' and the switches IT3j' or each supplementary switch coupling a feedback loop FbLj' to the output 102' of AMP2.

According to one embodiment, pixel 5 includes a first color channel having the photodiodes PDi and the amplifier AMP1, and a second color channel having the photodiodes PDj' and the amplifier AMP2. An advantage of this embodiment compared with an embodiment where all the photodiodes PDi of the first channel and all the photodiodes PDj' of the second channel would share the same first part of the same amplifier is that the reading of the first color channel may be done simultaneously to the reading of the second color channel.

In the embodiment described in relation with FIG. 5, although pixel 5 includes only two color channels having each its own amplifier AMP1 or AMP2, it will be in the capabilities of those skilled in the art to adapt pixel 5 to embodiments where pixel 5 includes more than two different color channels having each an amplifier similar to the amplifiers AMP1 and AMP2.

Further, although in pixel 5 of FIG. 5, each color channel includes the same number of photodiodes, it will be in the capabilities of those skilled in the art to adapt pixel 5 to a case where at least two color channels of pixel 5 have a different number of photodiodes.

In the above-described examples of embodiments and variants, the transistors T1 and T2i, and, in the embodiments of FIG. 5, the transistors T1' and T2j', are NMOS transistors. However, it will be in the capabilities of those skilled in the art to apply the described embodiments and variants to the case where these transistors are PMOS transistors, for example, by replacing transistors T3 and T4 (FIG. 1) by NMOS transistors, and by permutating the potentials received by nodes 110 and 112.

In the above-described examples of embodiments and variants, the amplifiers AMP1 and AMP2 are capacitive transimpedance amplifier (CTIA), although the described embodiments and variants also apply to other amplifiers having an operational amplifier, for example, to integrator amplifiers.

Various embodiments and variants have been described. Those skilled in the art will understand that certain features of these embodiments can be combined and other variants will readily occur to those skilled in the art. For example, in at least some of the feedback loop FbLi or Fblj', the capacitive element Cfb may be a capacitive element having a controllable capacitance value. Further, in a sensor having multiple pixels as described above, pixels and their readout circuits may be included by a same and unique semiconductor layer (i.e., a same and unique chip). Alternatively, pixels may be included by of a first semiconductor layer (i.e., a first chip), whereas the readout circuits of these pixels, excepting the second part of the amplifier of these readout circuits, may be included by a second semiconductor layer (i.e., a second chip—the second chip being stacked on the first chip).

Finally, the practical implementation of the embodiments and variants described herein is within the capabilities of those skilled in the art based on the functional description provided hereinabove.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A light sensor comprising a plurality of pixels, each pixel comprising:
    a plurality of first photodiodes, each first photodiode comprising a node; and
    a first amplifier comprising:
        a first part common to each of the first photodiodes, the first part comprising:
            an output terminal corresponding to an output terminal of the first amplifier, and
            a first metal oxide semiconductor (MOS) transistor of a differential pair of the first amplifier, and
        a second part comprising:
            a second MOS transistor of the differential pair, the second MOS transistor having a gate terminal coupled to a respective node of the corresponding first photodiode,
            a feedback loop circuit having a first end coupled to the node of the corresponding first photodiode,
            a first switch coupling a source terminal of the second MOS transistor to the first part of the first amplifier,
            a second switch coupling a drain terminal of the second MOS transistor to the first part of the first amplifier, and
            a third switch coupling a second end of the feedback loop circuit to the output terminal of the first amplifier.

2. The light sensor of claim 1, wherein the first part comprises a fourth switch, the fourth switch having a first terminal coupled to the output terminal of the first amplifier and a second terminal coupled to the third switch.

3. The light sensor of claim 1, wherein the first part comprises:
    an intermediate node of the differential pair coupled to a source terminal of the first MOS transistor, wherein the first switch of each second part is arranged between the source terminal of the second MOS transistor and the intermediate node;
    a first input node coupled to a gate terminal of the first MOS transistor; and
    a load stage of the differential pair coupled to a drain terminal of the first MOS transistor, wherein the second switch of each second part is arranged between the load stage and the drain terminal of the second MOS transistor.

4. The light sensor of claim 3, wherein the first part comprises:
    a fourth switch arranged between the source terminal of the first MOS transistor and the intermediate node; and
    a fifth switch arranged between the drain terminal of the first MOS transistor and the load stage, the fourth switch and the fifth switch being in a closed (ON) position.

5. The light sensor of claim 1, wherein each first photodiode belongs to only one group among several groups, each group comprising at least one photodiode, wherein each pixel comprises a control circuit configured to:
    selectively select each of the several groups;
    close the first switch and second switch of the second part of the first amplifier corresponding to the first photodiode associated with the selected group;
    close the third switch corresponding to the first photodiode associated with the selected group;
    open the first switch and second switch of the second part of the first amplifier corresponding to the first photodiode associated with the non-selected group; and
    open the third switch corresponding to the first photodiode associated with the non-selected group.

6. The light sensor of claim 1, wherein each feedback loop circuit comprises a capacitive element and a switch, wherein the capacitive element and the switch of the feedback loop circuit are arranged in a parallel configuration between the first end of the feedback loop circuit and the second end of the feedback loop circuit.

7. The light sensor of claim 1, wherein the second MOS transistor is disposed entirely at less than 50 μm from the corresponding first photodiode.

8. The light sensor of claim 1, wherein each pixel further comprises:
    a plurality of second photodiodes, each second photodiode comprising a second node; and
    a second amplifier comprising a first part and a plurality of second parts,
        wherein the first part of the second amplifier is common to each of the second photodiodes and comprises:
            an output terminal, the output terminal being an output terminal of the second amplifier, and
            a first metal oxide semiconductor (MOS) transistor of a second differential pair of the second amplifier, and
        wherein each second part of the second amplifier comprises:
            a second metal oxide semiconductor (MOS) transistor of the second differential pair, the second MOS transistor having a gate terminal coupled to a respective node of the corresponding second photodiode,
            a first switch coupling the source terminal of the second MOS transistor to the first part of the second amplifier, and
            a second switch coupling the drain terminal of the second MOS transistor to the first part of the second amplifier.

9. The light sensor of claim 8, wherein each pixel further comprises:

a second feedback loop circuit having a first end connected to the node of the corresponding second photodiode; and
a third switch coupling a second end of the second feedback loop circuit to the output terminal of the second amplifier.

10. The light sensor of claim 9, wherein each second part of the second amplifier comprises the third switch.

11. The light sensor of claim 10, wherein the first part of the second amplifier comprises a fourth switch, the fourth switch having a first terminal coupled to the output terminal of the second amplifier and a second terminal coupled to the third switch of the second amplifier.

12. The light sensor of claim 8, wherein the first part of the second amplifier comprises:
a second intermediate node of the second differential pair coupled to a source terminal of the first MOS transistor of the second differential pair, wherein the first switch of each second part of the second amplifier is arranged between the source terminal of the second MOS transistor of the second differential pair and the second intermediate node;
a first input node coupled to a gate terminal of the first MOS transistor of the second differential pair; and
a second load stage of the second differential pair coupled to a drain terminal of the first MOS transistor of the second differential pair, wherein the second switch of each second part of the second amplifier is arranged between the second load stage and the drain terminal of the second MOS transistor of the second differential pair.

13. The light sensor of claim 12, wherein the first part of the second amplifier comprises:
a fourth switch arranged between the source terminal of the first MOS transistor of the second differential pair and the second intermediate node; and
a fifth switch arranged between the drain terminal of the first MOS transistor of the second differential pair and the second load stage, the fourth switch of the first part of the second amplifier and the fifth switch of the first part of the second amplifier being in a closed (ON) position.

14. A method for reading a first photodiode from a plurality of photodiodes in a pixel of a light sensor, the method comprising:
selecting the first photodiode;
closing a first switch and a second switch of a second part of a first amplifier corresponding to the selected first photodiode;
closing a third switch corresponding to the selected first photodiode;
opening a first switch and a second switch of a second part of an amplifier corresponding to a non-selected first photodiode; and
opening a third switch corresponding to the non-selected first photodiode.

15. The method of claim 14, wherein each pixel comprises:
a plurality of first photodiodes, each first photodiode comprising a node;
a first amplifier comprising a first part and a plurality of second parts,
wherein the first part is common to each of the first photodiodes and comprises:
an output terminal, the output terminal being an output terminal of the first amplifier, and
a first metal oxide semiconductor (MOS) transistor of a differential pair of the first amplifier, and
wherein each second part comprises:
a second metal oxide semiconductor (MOS) transistor of the differential pair, the second MOS transistor having a gate terminal coupled to a respective node of the corresponding first photodiode,
a first switch coupling a source terminal of the second MOS transistor to the first part of the first amplifier, and
a second switch coupling a drain terminal of the second MOS transistor to the first part of the first amplifier;
a feedback loop circuit having a first end connected to the node of the corresponding first photodiode; and
a third switch coupling a second end of the feedback loop circuit to the output terminal of the first amplifier.

16. The method of claim 15, wherein the first part comprises:
an intermediate node of the differential pair coupled to a source terminal of the first MOS transistor, wherein the first switch of each second part is arranged between the source terminal of the second MOS transistor and the intermediate node;
a first input node coupled to a gate terminal of the first MOS transistor; and
a load stage of the differential pair coupled to a drain terminal of the first MOS transistor, wherein the second switch of each second part is arranged between the load stage and the drain terminal of the second MOS transistor.

17. The method of claim 14, further comprising resetting the selected first photodiode by closing a switch in a feedback loop circuit having a first end connected to a node of the selected first photodiode and a second end connected to an output terminal of the first amplifier through the closed third switch.

18. The method of claim 14, wherein the pixel further comprises a plurality of second photodiodes and a second amplifier, the method further comprising:
selecting a second photodiode from the plurality of second photodiodes;
closing a first switch and a second switch of a second part of the second amplifier corresponding to the selected second photodiode;
closing a third switch corresponding to the selected second photodiode;
opening a first switch and a second switch of a second part of the second amplifier corresponding to a non-selected second photodiode; and
opening a third switch corresponding to the non-selected second photodiode.

19. The method of claim 14, further comprising:
reading an output signal from an output terminal of the first amplifier when the first switch, second switch, and third switch corresponding to the selected first photodiode are closed; and
processing the output signal to determine a light intensity detected by the selected first photodiode.

20. A light sensor comprising a plurality of pixels, each pixel, comprising:
a plurality of first photodiodes, each first photodiode belonging to only one group among several groups, each group comprising at least one photodiode, each first photodiode comprising a node; and
a first amplifier comprising:

a first part common to each of the first photodiodes, the
first part comprising:
an output terminal corresponding to an output terminal of the first amplifier, and
a first metal oxide semiconductor (MOS) transistor of a differential pair of the first amplifier, and
a second part comprising:
a second MOS transistor of the differential pair, the second MOS transistor having a gate terminal coupled to a respective node of the corresponding first photodiode,
a first switch coupling a source terminal of the second MOS transistor to the first part of the first amplifier, and
a second switch coupling a drain terminal of the second MOS transistor to the first part of the first amplifier; and
a control circuit configured to:
selectively select each of the several groups;
close the first switch and second switch of the second part of the first amplifier corresponding to the first photodiode associated with the selected group;
close a third switch corresponding to the first photodiode associated with the selected group;
open the first switch and second switch of the second part of the first amplifier corresponding to the first photodiode associated with the non-selected group; and
open a third switch corresponding to the first photodiode associated with the non-selected group.

* * * * *